United States Patent [19]
Szabo

[11] Patent Number: 5,873,610
[45] Date of Patent: Feb. 23, 1999

[54] FEMALE CONNECTOR MEMBER FOR LARGE TOLERANCE MALE MEMBER ENDFORMS

[75] Inventor: George Szabo, Ortonville, Mich.

[73] Assignee: ITT Automotive, Inc., Auburn Hills, Mich.

[21] Appl. No.: 769,666

[22] Filed: Dec. 19, 1996

[51] Int. Cl.$^6$ .............................. F16L 35/00; F16L 39/00
[52] U.S. Cl. ............................................ 285/319; 285/308
[58] Field of Search ................................... 285/319, 305, 285/308

[56] References Cited

U.S. PATENT DOCUMENTS

| | | | |
|---|---|---|---|
| 3,588,149 | 6/1971 | Demler | 285/110 |
| 3,990,727 | 11/1976 | Gallagher | 285/26 |
| 4,266,814 | 5/1981 | Gallagher | 285/319 |
| 4,641,859 | 2/1987 | Walters | 285/27 |
| 4,681,350 | 7/1987 | Gaita | 285/315 |
| 4,793,639 | 12/1988 | Glover et al. | 285/319 |
| 4,804,213 | 2/1989 | Guest | 285/308 |
| 4,844,512 | 7/1989 | Gahwiler | 285/39 |
| 4,948,175 | 8/1990 | Bartholomew | 285/39 |
| 4,991,882 | 2/1991 | Gahwiler | 285/331 |
| 5,002,315 | 3/1991 | Bartholomew | 285/93 |
| 5,104,157 | 4/1992 | Bahner | 285/307 |
| 5,161,832 | 11/1992 | McNaughton et al. | 285/319 |
| 5,213,376 | 5/1993 | Szabo | 285/39 |
| 5,251,940 | 10/1993 | DeMoss et al. | 285/87 |
| 5,284,369 | 2/1994 | Kitamura | 285/322 |
| 5,303,963 | 4/1994 | McNaughton et al. | 285/319 |
| 5,374,088 | 12/1994 | Moretti et al. | 285/305 |
| 5,423,577 | 6/1995 | Ketcham | 285/319 |
| 5,462,313 | 10/1995 | Rea et al. | 285/319 |
| 5,466,017 | 11/1995 | Szabo | 285/319 |
| 5,533,761 | 7/1996 | Ostrander | 285/38 |
| 5,542,716 | 8/1996 | Szabo | 285/319 |
| 5,542,717 | 8/1996 | Rea et al. | . |
| 5,568,946 | 10/1996 | Jackowski | 285/38 |
| 5,573,279 | 11/1996 | Rea et al. | . |
| 5,575,512 | 11/1996 | Umezawa | 285/319 |
| 5,725,257 | 3/1998 | Sakane et al. | 285/319 |

FOREIGN PATENT DOCUMENTS

| | | |
|---|---|---|
| 0459812 | 12/1991 | European Pat. Off. . |
| 0330350 | 8/1996 | European Pat. Off. . |
| 5272 | of 1882 | United Kingdom . |
| 9320379 | 10/1993 | WIPO . |

*Primary Examiner*—Eric K. Nicholson
*Attorney, Agent, or Firm*—Thomas N. Twomey

[57] ABSTRACT

A quick connect coupling including a female connector member adapted for quick connect engagement with a male connector member. The male connector member has an annular bead defined by leading and trailing annular edges. The female connector member defines an axial bore sized to slidably receive a leading end of the male member defined forwardly of the leading annular edge of the bead and a plurality of circumferentially spaced resilient fingers adapted to snap into position behind the bead and into engagement with the trailing annular edge of the bead as the leading end of the male member moves into the bore and the leading annular edge of the bead moves into engagement with a radial seating surface defined around the entrance to the bore. The intersection between the bore and the radial seating surface is relieved or chamfered over a radial distance less than the radial height of the bead so that the leading annular edge of the bead may seat against the radial seating surface, and the resilient fingers may snap into position behind the trailing annular edge of the bead, irrespective of tolerance variations in the contour of the leading annular edge of the bead caused, for example, by normal manufacturing tolerances or by tool die wear.

8 Claims, 4 Drawing Sheets

FEMALE CONNECTOR MEMBER FOR LARGE TOLERANCE MALE MEMBER ENDFORMS

INTRODUCTION

This invention relates to quick connectors for joining tubular conduits with a snap fit between male and female members and more particularly to such connectors which are able to provide a satisfactory connection between the male and female members irrespective of large tolerance variations in the endform of the male member.

BACKGROUND OF THE INVENTION

Quick connectors typically include a female connector member adapted for selective locking quick connect engagement with a male connector member. The male connector member typically includes an annular bead defined by leading and trailing annular edges. The female connector member typically defines an axial bore sized to slidably receive a leading end of the male member defined forwardly of the leading annular edge of the bead and a plurality of circumferentially spaced resilient fingers adapted to snap into place behind the bead and into engagement with the trailing annular edge of the bead as the leading end of the male member moves into the bore and the leading annular edge of the bead moves into engagement with a radial seating surface defined around the entrance to the bore.

In so long as the leading annular edge of the bead on the male member maintains a generally vertical, planar profile, the male and female members operate satisfactorily to form a firm snap fit connection in response to insertion of the male member into the bore of the female member. However, as the profile or contour of the leading edge of the bead assumes a large radius or conical profile in response, for example, to normal manufacturing tolerances or tool die wear, the leading annular edge of the bead is unable to seat against the radial seating surface defined around the entrance to the bore of the female member with the result that the resilient fingers hang up on the bead and are unable to snap into position behind the bead to form the snap connection.

One solution to this problem is to simply increase the axial spacing on the female member between the free ends of the fingers and the radial seating surface so that the fingers will be able to snap into engagement with the rear annular edge of the bead even where the front annular edge cannot seat firmly against the radial seating surface because of distortions in the profile of the leading annular edge. However, this solution has the disadvantages that the axial length of the female connector member is increased significantly to allow the greater spacing, and the connection between the male and female members becomes very loose in situations where the bead of the male connector member defines a relatively vertical profile so that the front annular edge of the bead seats firmly against the radial seating surface.

SUMMARY OF THE INVENTION

This invention is directed to the provision of an improved quick connector.

More particularly, this invention is directed to the provision of a quick connector especially suitable for accommodating large tolerance variations in the configuration of the male member endform.

The quick connector of the invention is of the type including a female connector member adapted for selective locking quick connect engagement with a male connector member, the male connector member having an annular bead defined by leading and trailing annular edges, the female connector member defining an axial bore sized to slidably receive a leading end of the male member defined forwardly of the leading annular edge of the bead, and a plurality of circumferentially spaced resilient fingers adapted to snap into position behind the bead and into engagement with the trailing annular edge of the bead as the leading end of the male member moves into the bore and the leading annular edge of the bead moves into engagement with a radial seating surface defined around the entrance to the bore.

According to the invention, the intersection between the bore and the radial seating surface is relieved over a radial distance less than the radial height of the bead so that the leading annular edge of the bead may seat against the radial seating surface and the resilient fingers may snap into position behind the trailing annular edge of the bead irrespective of tolerance variations in the contour of the leading annular edge of the bead.

According to a further feature of the invention, the relief at the intersection between the bore and the radial seating surface comprises a chamfer surface extending from a location on the radial seating surface spaced radially outwardly of the bore by a distance less than the radial height of the bead to a location on the bore forwardly of the radial seating surface. This specific relief configuration readily accommodates the typical flaring or distortion of the contour of the leading annular edge of the bead while still allowing firm seating of the bead against the radial seating surface.

According to a further feature of the invention, the chamfer surface comprises a pair of circumferentially spaced arcuate chamfer surface portions positioned at diametrically opposed locations around the entrance to the bore and the connector further includes straight upper and lower parallel slots extending across the radial seating surface above and below the bore, defining the upper and lower extents of the arcuate chamfer surfaces, and defining upper and lower straight chamfer surface portions for coaction with the arcuate chamfer surface portions. This specific chamfer surface configuration provides the desired accommodation of variations in the contour of the bead while facilitating the manufacture of the female member utilizing known and typical injection molding tooling techniques.

In the disclosed embodiment of the invention, the female connector member comprises two parts including a tubular housing and a retainer snap fit to an open end of the tubular housing and defining the fingers, the bore, the radial seating surface, and the chamfer surfaces at the intersection of the bore and the radial seating surface. This two-part snap fit arrangement for the female connector member facilitates the manufacture of the female connector member.

DETAILED DESCRIPTION OF THE PREFERRED EMBODIMENT

Figures 1, 2:
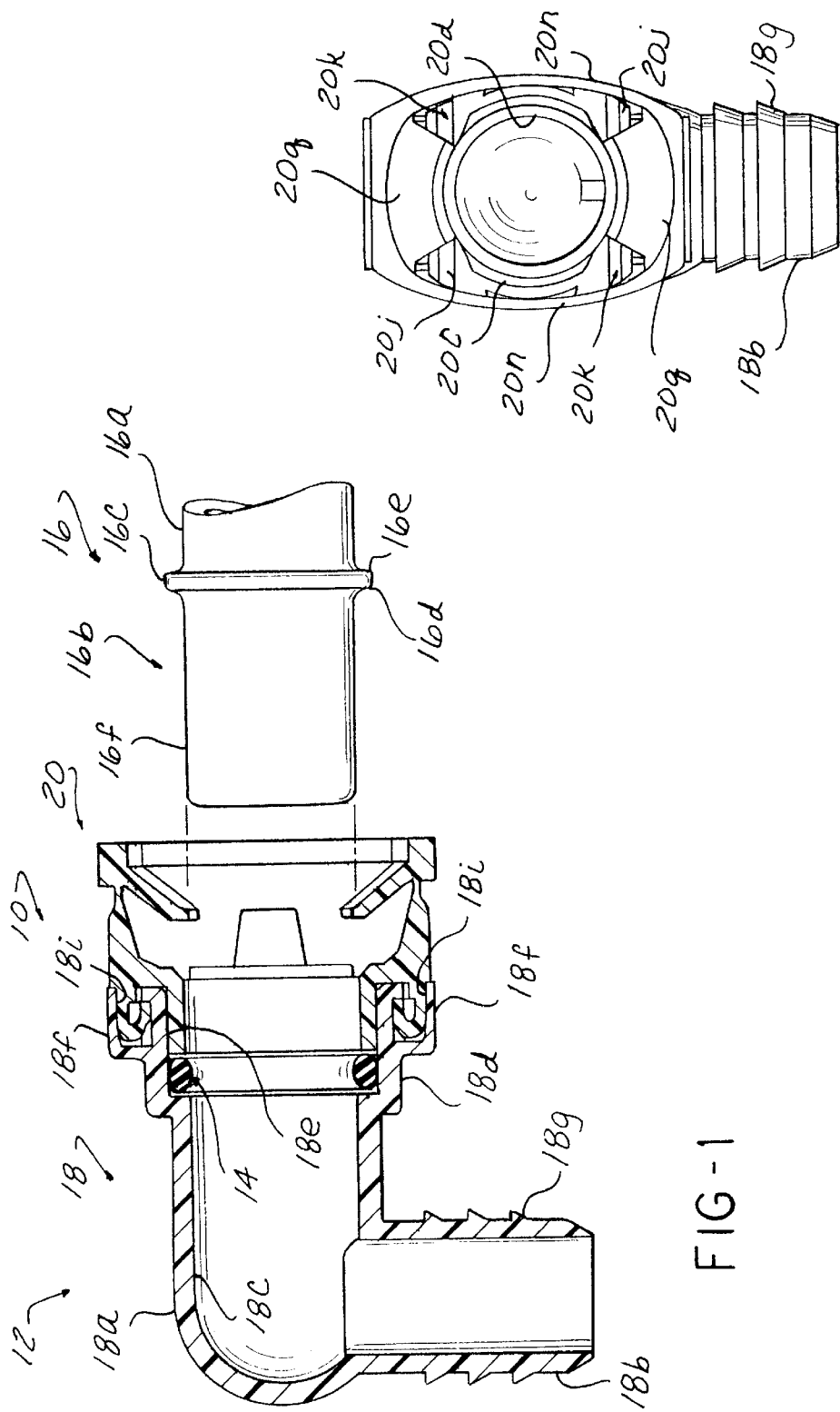
FIG. 1 is an exploded view of a quick connector according to the invention with the female member shown in cross-section.
FIG. 2 is an end view of the female connector member.

The quick connector 10 of the invention, broadly considered, includes (FIG. 1) a female connector member assembly 12, a seal 14, and a male connector member 16.

Female connector member assembly 12 includes a tubular housing 18 and a retainer 20 which may both be formed of a suitable plastic material in a suitable injection molding operation.

Figure 7:
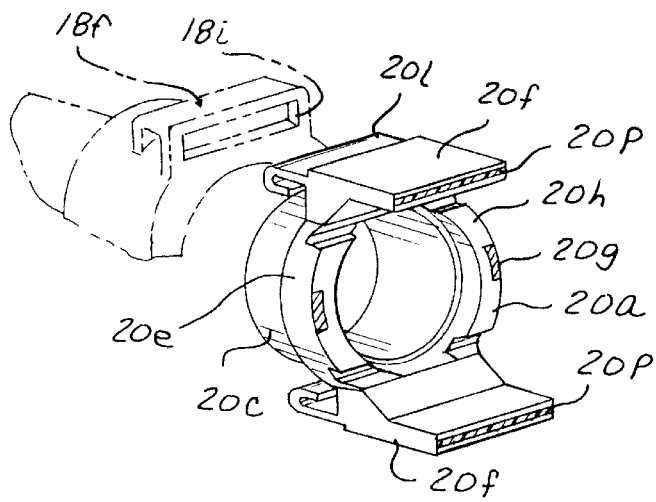

Housing 18 includes a main body portion 18a and an adapted portion 18b. Main body portion 18a defines a central cylindrical bore 18c and includes an enlarged diameter portion 18d defining a counterbore 18e, and upper and lower connector portions 18f (see also FIG. 7).

Adapter portion 18b includes barbs 18g to facilitate connection of housing 18 to a further conduit member and is arranged at right angles with respect to main body portion 18a to define an angled fluid passage extending through the housing.

Connector portions 18f define openings or windows (FIG. 7) to facilitate snapping interconnection of housing 18 and retainer 20.

Figure 4:
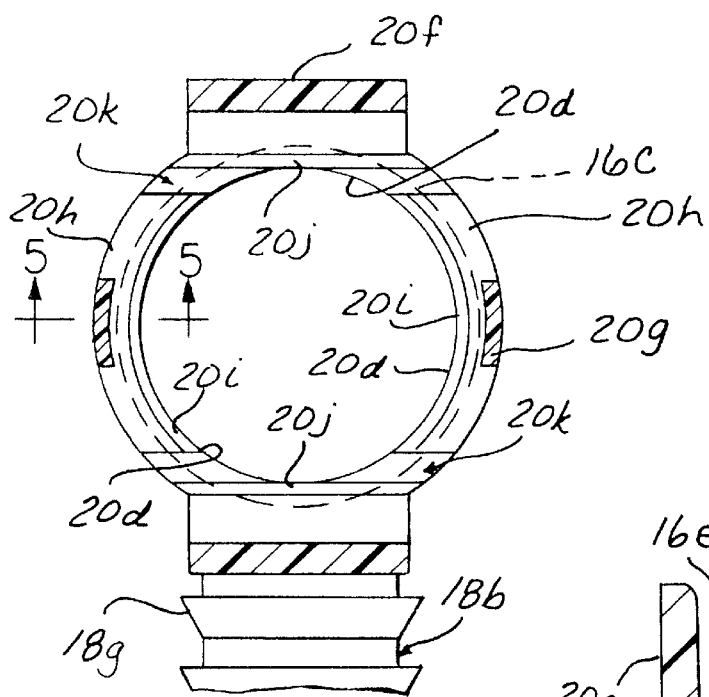
FIG. 4 is a cross-sectional view taken on line 4—4 of FIG. 3.
Figure 6:
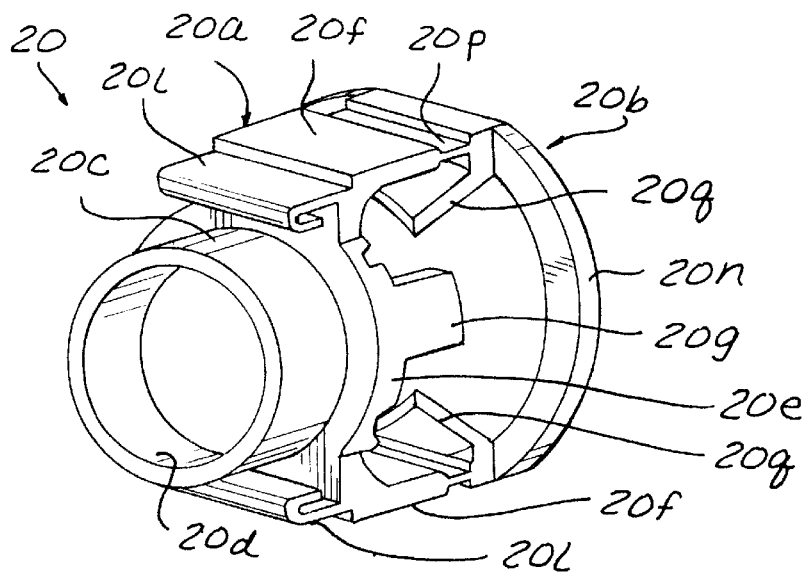
FIGS. 6 and 7 are perspective views of a retainer forming a part of the female connector member.

Retainer 20 (FIGS. 4, 6 and 7) includes a main body portion 20a and a finger portion 20b.

Main body portion 20a includes a cylindrical insert portion 20c defining a bore 20d, generally corresponding in diameter to housing bore 18c, and a flange portion 20e. Flange portion 20e includes circumferentially spaced upper and lower mounting arms 20f and circumferentially spaced guide arms 20g circumferentially interposed between mounting arms 20f. Flange portion 20e defines a generally annular, radially extending seating surface 20h intersecting bore 20d. The intersection of radial seating surface 20h and bore 20d is relieved over a radial distance less than the radial height of the bead of the male member.

Specifically, the relief at the intersection between the bore and the radial seating surface comprises a chamfer surface including a pair of circumferentially spaced arcuate chamfer surface portions 20i positioned at diametrically opposed locations around the entrance to bore 20d and further, upper and lower straight chamfer surface portions 20j extending transversely of radial seating surface 20h tangent to the upper and lower points of bore 20d. Chamfers 20j are defined as the angled upper edge of an upper transverse groove or slot 20k and as the angled lower edge of a lower transverse groove or slot 20k. Slots 20k will be seen to define the upper and lower extents of arcuate chamfer surfaces 20i and the chamfer surface portions will be seen to extend from a location on the radial seating surface spaced radially outwardly of the bore by a distance less than the radial height of the bead of the male member to a location on the bore forwardly of the radial seating surface.

Figure 3:
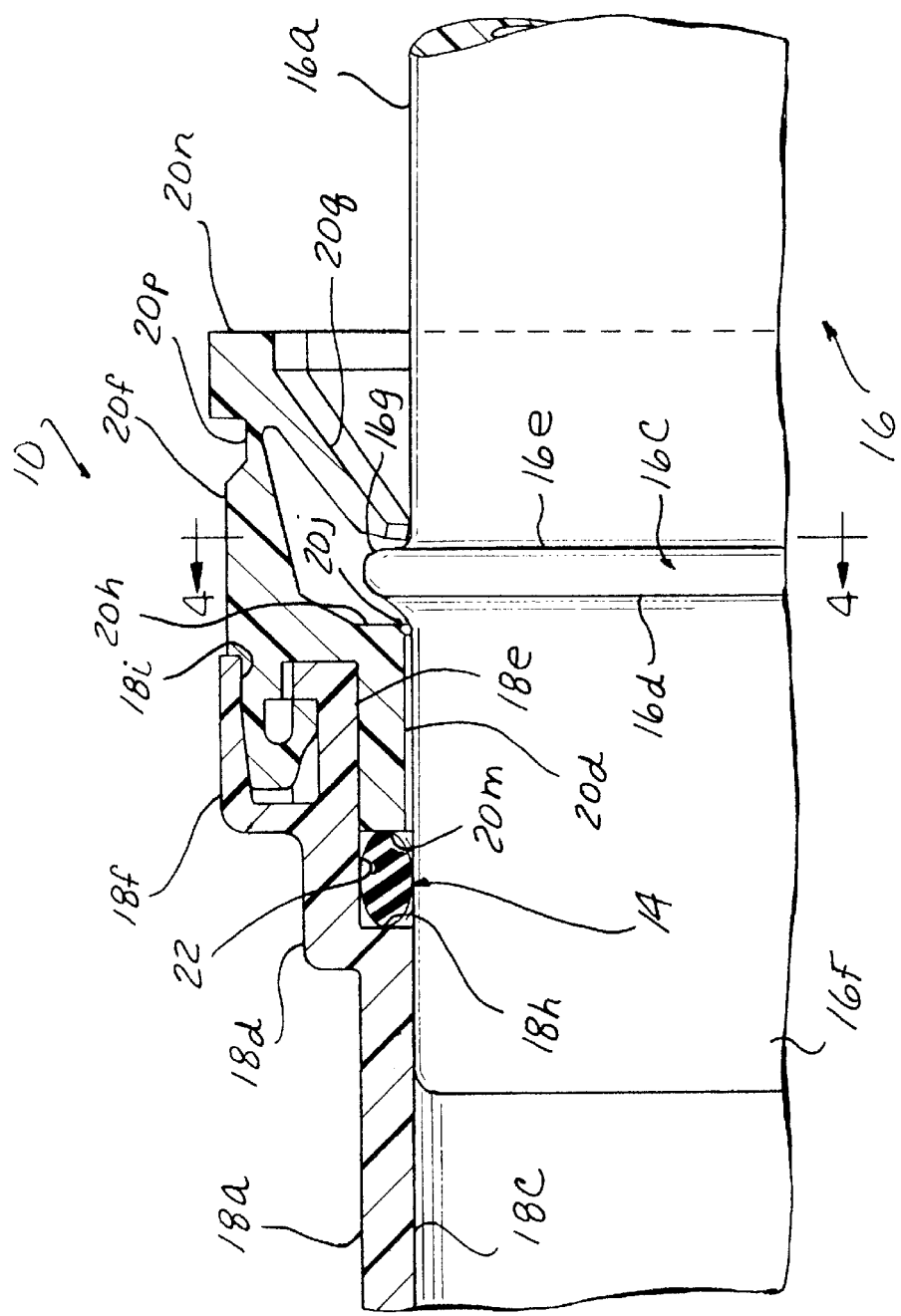
FIG. 3 is a fragmentary cross-sectional view showing the snap fit engagement of the male and female connector members.

Retainer main body portion 20a further includes upper and lower connector portions 20l arranged to be snappingly received in the windows defined by connector portions 18f of housing member 18 to snappingly connect the retainer to the open end of the main body portion of housing 18 with cylindrical insert 20c of the retainer fitting slidably and snugly within counterbore 18e and flange portion 20e positioned against the open annular end of housing member 18. With the retainer thus snappingly secured to the housing, the forward annular edge 20m (FIG. 3) of the cylindrical insert 20c coacts with an annular shoulder 18h at the intersection of bore 18c and counterbore 18e to define a seal groove 22.

Retainer finger portion 20b includes a ring 20n connected to mounting arms 20f via live hinges 20p, and upper and lower resilient fingers 20q formed integrally with upper and lower portions of ring 20n radially inwardly of live hinges 20p.

Seal 14 (FIG. 3) comprises an elastomeric O-ring seal and is positioned in seal groove 22.

Male connector member 16 is formed, for example, as a steel tubing and includes (FIGS. 1 and 3) a main body portion 16a and an endform 16b. Endform 16b includes an annular bead 16c, including a leading annular edge 16d and a trailing annular edge 16e, and a leading end 16f defined forwardly of leading annular edge 16d and sized to fit slidably and snugly in female connector member bores 20d/18c.

As the male connector member is inserted into the female member assembly (FIGS. 1 and 3), the leading end 16f of the male member enters retainer bore 20d and moves past seal 14 and into housing bore 18c. As the leading end 16f enters the bores of the female member, bead 16c biases the fingers 20q radially outwardly to enable the bead to move therepast whereafter, as the leading annular edge 16d of the bead seats against radial surface 20h, the fingers 20q snap radially inwardly into position behind the bead and into engagement with the trailing annular edge 16e of the bead, whereby to maintain the female member assembly and the male member in firm coupled relation.

Figure 8:
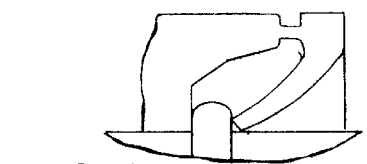
FIGS. 8–11 illustrate prior art quick connect constructions.
Figure 14:
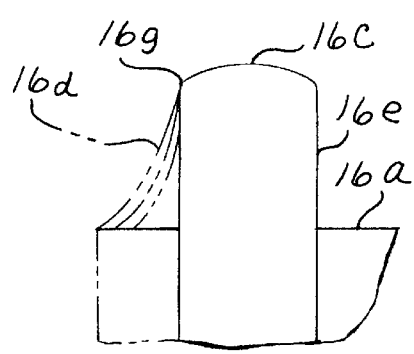
FIG. 14 is a detail view showing tolerance variations in the profile of the bead of the male member.

This idealized condition, in the environment of a prior art quick connect coupling, is seen in FIG. 8 wherein the planar front or leading annular edge of the bead seats firmly against the radial seating surface of the female member and the fingers securely engage the trailing annular edge of the bead. However, as best seen in FIG. 14, the normally planar or vertical annular leading edge 16d of the bead in actual practice experiences wide tolerance variations so that the radius at the intersection of the leading annular edge of the bead and the cylindrical main body of the tube 16a may assume any of the large radius conical profile configurations seen in dash lines in FIG. 14. These tolerance variations in the contour or profile of the leading edge 16d of the bead may occur, for example, due to normal manufacturing tolerances or due to wear in the dies utilized to form the bead.

Figure 9:
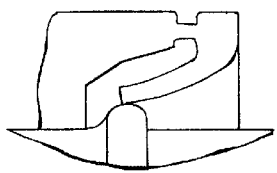
Figure 10:
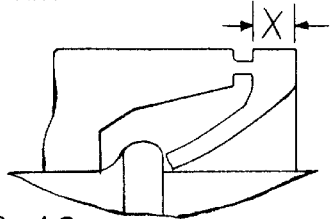

In either event, the tolerance variations in the leading annular edge of the bead, as best seen in FIG. 9, cause problems in the prior art environment and, specifically, prevent the leading annular edge of the bead from seating against the radial seating surface of the retainer and cause the fingers to hang up on the bead rather than snapping into position behind the trailing annular edge of the bead so that a snap coupling is not achieved between the male and female members. This condition may be addressed, as seen in FIG. 10, by simply increasing the axial length of the retainer by an amount X in compensation for the fact that the bead is unable to seat against the radial seating surface of the retainer so that, as seen in FIG. 10, the fingers may snap into position behind the bead even where the bead, due to tolerance variations, has a conical or concavo configuration.

Figure 11:
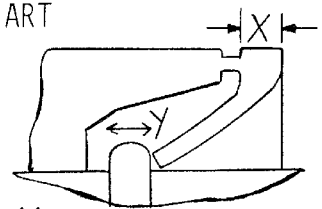

However, as seen in FIG. 11, this solution has the result of lengthening the retainer, and thereby undesirably increasing the overall length of the quick connect coupling, by an amount X and further has the effect of creating an extremely loose coupling between the male and female members in situations where the leading annular edge of the bead remains relatively vertical or planar so that the coupling members may undergo relative "rattling" movement as shown by the arrow Y.

Figure 5:
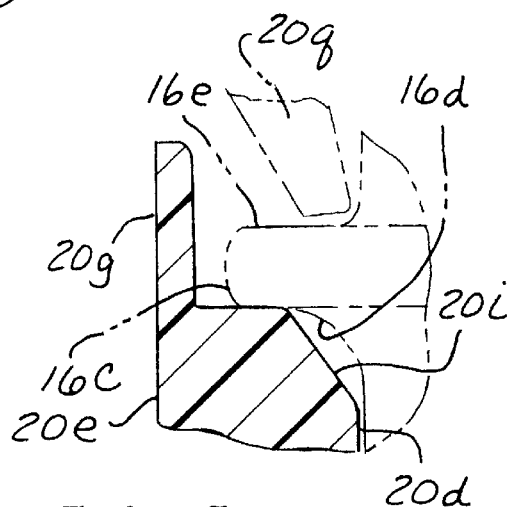
FIG. 5 is a cross-sectional view taken on line 5—5 of FIG. 4.
Figure 12:
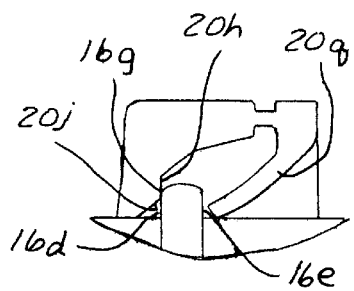
FIGS. 12 and 13 illustrate the operation of the invention construction.
Figure 13:
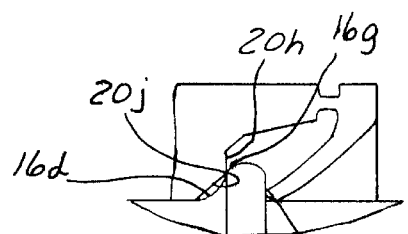

According to the invention, and as seen in FIGS. 12 and 13, the male and female members are allowed to move into firm snug coupling relation irrespective of tolerance variations in the leading annular edge of the bead. Specifically, as seen in FIG. 12, when the leading annular edge of the bead has a normal vertical planar configuration, the outer peripheral edge portion 16g of the leading edge of the bead moves into seating engagement with the radial seating surface 20h to allow fingers 20q to move into snapping engagement with the rear annular edge 16e, and this firm snapping engagement is also achieved in the scenario seen in FIG. 13 wherein the leading annular edge of the bead assumes a deformed, conical configuration with the deformed profile of the leading edge in this scenario moving into and nesting within the space provided by the chamfer surface portions 20j (and, as seen in FIG. 5, by the chamfer surface portions 20i). The chamfer surface portions 20i and 20j are ideally provided on a 45° angle with respect to the intersection of the radial seating surface and the bore and, as previously indicated, the chamfer extends from a location on the radial seating surface spaced radially outwardly of the bore by a distance less than the radial height of the bead so that the radially outer peripheral portion 16g of the bead may continue to seat against the radial seating surface irrespective of the tolerance variations in the contour of the leading annular edge of the bead.

The invention will be seen to provide a simple structure and methodology for insuring firm coupling engagement of the male and female members of the quick connect coupling irrespective of tolerance variations in the contour of the leading annular edge of the bead of the male member and will be seen to achieve this result at a minimum of cost and complexity and without increasing the overall length of the quick connect coupling.

Whereas a preferred embodiment of the invention has been illustrated and described in detail, it will be apparent that various changes may be made in the disclosed embodiment without departing from the scope or spirit of the invention. For example, although the chamfer surface has been illustrated and described as comprising a pair of circumferentially spaced arcuate chamfer surfaces positioned at diametrically opposed locations around the entrance to the bore in combination with straight upper and lower chamfer surfaces defined by slots extending across the radial seating surface at the top and bottom of the bore, it will be understood that this particular combination of chamfer surfaces results from tool die considerations and the chamfer surface, from an inventive standpoint, may have any configuration including a continuous chamfer surface around the entire intersection of the radial seating surface and the bore. It will also be apparent that the female connector member may have a one-piece construction rather than the two-piece construction herein disclosed.

I claim:

1. A female connector member adapted for selective locking quick connect engagement with a male connector member, the male connector member having an annular bead defined by leading and trailing annular edges, the female connector member defining a radial seating surface with an axial bore sized to slidably receive a leading end of the male connector member defined forwardly of the leading annular edge of the bead and at least one resilient finger adapted to snap into position behind the bead and into engagement with the trailing annular edge of the bead as the leading end of the male connector member moves into the bore and the leading annular edge of the bead moves into engagement with the radial seating surface defined around the entrance to the bore:

characterized in that an intersection between the bore and the radial seating surface of the female connector member is relieved over a radial distance less than the radial height of the bead of the male connector member defining a relieved surface at the intersection so that the leading annular edge of the bead may seat against the radial seating surface and the resilient finger may snap into position behind the trailing annular edge of the bead irrespective of tolerance variations in the contour of the leading annular edge of the bead, the female connector member further includes straight and parallel slots extending across the radial seating surface on diametrically opposite sides of the bore and separating the relieved surface into first and second portions.

2. The female connector member according to claim 1 wherein the relieved surface at the intersection between the bore and the radial seating surface comprises a chamfer surface extending from a location on the radial seating surface spaced radially outwardly of the bore by a distance less than the radial height of the bead to a location on the bore forwardly of the radial seating surface.

3. The female connector member according to claim 2 wherein the female connector member comprises at least two parts including a tubular housing and a retainer snap fit to an open end of the tubular housing and defining a plurality of circumferentially spaced fingers, the bore, the radial seating surface, and the chamfer surface at the intersection of the bore and the radial seating surface.

4. A female connector member adapted for selective locking quick connect engagement with a male connector member, the male connector member having an annular bead defined by leading and trailing annular edges, the female connector member defining a radial seating surface with an axial bore sized to slidably receive a leading end of the male connector member defined forwardly of the leading annular edge of the bead and at least one resilient finger adapted to snap into position behind the bead and into engagement with the trailing annular edge of the bead as the leading end of the male connector member moves into the bore and the leading annular edge of the bead moves into engagement with the radial seating surface defined around the entrance to the bore:

characterized in that an intersection between the bore and the radial seating surface of the female connector member is relieved over a radial distance less than the radial height of the bead of the male connector member defining a relieved surface at the intersection so that the leading annular edge of the bead may seat against the radial seating surface and the resilient finger may snap into position behind the trailing annular edge of the bead irrespective of tolerance variations in the contour of the leading annular edge of the bead, wherein the relieved surface includes a pair of circumferentially spaced arcuate chamfer surface portions positioned at diametrically opposed locations around the entrance to the bore; and the female connector member further includes straight upper and lower parallel slots extending across the radial seating surface above and below the bore and defining the upper and lower extents of the arcuate chamfer surfaces.

5. The female connector member according to claim 4 wherein the upper edge of the upper slot and the lower edge of the lower slot define further, straight chamfer surface portions for coaction with the arcuate chamfer surface portions.

6. A quick connect coupling including a male connector member having an annular bead defined by leading and trailing annular edges, and a leading end defined forwardly of the leading annular edge; and a female connector member defining a radial seating surface with an axial bore sized to slidably receive the leading end of the male connector member and a plurality of circumferentially spaced resilient fingers adapted to snap into position behind the bead and into engagement with the trailing annular edge of the bead as the leading annular edge of the bead moves into engagement with the radial seating surface defined around the entrance to the bore:

characterized in that an intersection between the bore and the radial seating surface of the female connector member is relieved over a radial distance less than the radial height of the bead of the male connector member defining a relieved surface at the intersection so that the leading annular edge of the bead may seat against the radial seating surface and the resilient fingers may snap into position behind the trailing annular edge of the bead irrespective of tolerance variations in the contour of the leading annular edge of the bead, the female connector member includes straight parallel slots extending across the radial seating surface on diametrically opposite sides of the bore and separating the relieved surface into first and second portions.

7. For use with a female connector member adapted for selective locking quick connect engagement with a male connector member, the male connector member having an annular bead defined by leading and trailing annular edges, the female connector member defining a radial seating surface with an axial bore sized to slidably receive a leading end of the male connector member defined forwardly of the leading annular edge of the bead and a plurality of circumferentially spaced resilient fingers adapted to snap into position behind the bead and into engagement with the trailing annular edge of the bead as the leading end of the male connector member moves into the bore and the leading annular edge of the bead moves into engagement with the radial seating surface defined around the entrance to the bore, a method for insuring that the leading annular edge of the bead may seat against the radial seating surface and the resilient fingers may snap into position behind the trailing annular edge of the bead irrespective of tolerance variations in the contour of the leading annular edge, the method comprising the step of:

relieving an intersection between the bore and the radial seating surface of the female connector member over a radial distance less than the radial height of the bead of the male connector member defining a relieved surface at the intersection so that as the contour of the leading annular edge of the bead varies because of tool die wear or manufacturing tolerance variations from a planar annular edge to a conical annular edge extending radially inwardly and forwardly, the conical annular edge may tuck into the relieved surface at the intersection of the base of the bore and the radial seating surface of the female connector member to allow the radially outer periphery of the front annular edge of the bead to continue to seat against the radial seating surface and allow the resilient fingers to continue to snap into position behind the trailing annular edge, the female connector member includes straight parallel slots extending across the radial seating surface on diametrically opposite sides of the bore and separating the relieved surface into first and second portions.

8. The method according to claim 7 wherein the step of relieving the intersection between the bore and the radial seating surface comprises the step of:

providing a chamfer surface extending from a location on the radial seating surface spaced radially outwardly of the bore by a distance less than the radial height of the bead to a location on the bore forwardly of the radial seating surface.

* * * * *